US008752371B2

(12) United States Patent
Ferraz et al.

(10) Patent No.: US 8,752,371 B2
(45) Date of Patent: Jun. 17, 2014

(54) INDEPENDENT METERING VALVE WITH FLOW LIMITER

(75) Inventors: John Ferraz, Romeoville, IL (US); Aleksandar M. Egelja, Naperville, IL (US); Pengfei Ma, Naperville, IL (US); Matthew J. Beschorner, Plainfield, IL (US)

(73) Assignee: Caterpillar Inc., Peoria, IL (US)

( * ) Notice: Subject to any disclaimer, the term of this patent is extended or adjusted under 35 U.S.C. 154(b) by 732 days.

(21) Appl. No.: 12/971,149

(22) Filed: Dec. 17, 2010

(65) Prior Publication Data

US 2012/0152368 A1 Jun. 21, 2012

(51) Int. Cl.
*F16D 31/02* (2006.01)
*F15B 13/042* (2006.01)

(52) U.S. Cl.
USPC .................... 60/459; 60/420; 91/446; 91/454

(58) Field of Classification Search
USPC ............... 60/420, 422, 459; 91/445, 446, 454
See application file for complete search history.

(56) References Cited

U.S. PATENT DOCUMENTS

| | | | |
|---|---|---|---|
| 4,286,502 A | 9/1981 | Bianchetta et al. | |
| 4,364,304 A | 12/1982 | Andersen et al. | |
| 5,150,574 A | 9/1992 | Hirata et al. | |
| 6,662,705 B2 | 12/2003 | Huang et al. | |
| 7,204,084 B2 | 4/2007 | Ma et al. | |
| 2002/0148223 A1 | 10/2002 | Reiners et al. | |
| 2005/0087065 A1 | 4/2005 | Yoshino | |
| 2006/0266027 A1 | 11/2006 | Ma et al. | |
| 2010/0107623 A1* | 5/2010 | Kerckhove et al. | 60/459 |

* cited by examiner

*Primary Examiner* — Michael Leslie
(74) *Attorney, Agent, or Firm* — Miller, Matthias & Hull

(57) ABSTRACT

An independent metering valve (IMV) assembly is disclosed that includes a metering stem including an inlet. The IMV assembly also includes a hydro-mechanical control valve in communication with a fluid source and the inlet. The control valve also including a spool with a closed end and an open end. The control valve includes a biasing member that biases the control valve or spool towards an open position thereby establishing communication between the fluid source and the inlet. The control valve also including a load signal line providing communication between an outlet of the control valve upstream of the inlet and the closed end of the spool. Wherein high pressure in the load signal line allowing the control valve to move towards a closed position thereby overcoming bias of the biasing member and reducing flow to the inlet during a high pressure condition.

17 Claims, 3 Drawing Sheets

INDEPENDENT METERING VALVE WITH FLOW LIMITER

TECHNICAL FIELD

This disclosure relates generally to a system and method for hydro-mechanically limiting flow to an independent metering valve (IMV) assembly.

BACKGROUND

Controlling an operation of a hydraulic output device of a hydraulic circuit may be conventionally accomplished using a single spool-type valve. A single spool valve has a series of metering slots which control flows of hydraulic fluid in the hydraulic circuit, including a flow from a pump to the hydraulic output device and a flow from the hydraulic output device to a tank, drain or reservoir. When the hydraulic output device is a hydraulic cylinder, these flows are commonly referred to as pump-to-cylinder flow and cylinder-to-tank flow, respectively.

The metering slots are machined into the stem of the spool valve. With this arrangement, slot timing and modulation are fixed. In order to modify the performance of the hydraulic circuit, the stem must be re-machined, which may be costly. Furthermore, in order to add additional features to the performance of the hydraulic circuit, an entirely new stem may be required. As a result, adding features to or optimizing the performance of the hydraulic circuit can be expensive and time consuming.

A more flexible system is found in an independent metering valve (IMV) assembly, which typically includes four independently operable, electronically controlled metering valves to control flows within the hydraulic circuit. The four independently controlled metering valves may be referred to as the "metering stem". Two of the metering valves are disposed between an input port and the output ports. The other two metering valves are disposed between the output ports and the return port. Because each of the metering valves is controlled electronically, the performance of the hydraulic circuit can be modified by adjusting a control signal to one or more valves of the metering stem. Examples of IMV assemblies utilized for hydraulic functions are disclosed in US2006/0266027 and US2005/0087065.

As shown in US2006/0266027 and US2005/0087065, it is known to utilize an IMV assembly in association with an internal combustion engine. Such IMV assemblies typically receive pressurized hydraulic fluid from a hydraulic pump that is in fluid communication with a single hydraulic load providing a single hydraulic function. For example, an IMV assembly may be fluidly coupled with a two-way hydraulic cylinder used for a single output function (e.g., tipping a loader bucket on a front end loader). As an IMV assembly typically includes a metering stem with four independently controllable metering valves, one pair of valves is coupled to the head end of the hydraulic cylinder and the other pair of valves is coupled with the rod end of the cylinder. Each pair of metering valves in an IMV assembly allows flow both to and from the hydraulic cylinder. The independently controllable metering valves may be electronically controlled using a controller, typically depending upon various input signals received from one or more sensors.

Often, multiple IMVs are used in a hydraulic system that employs a single source of fluid, or a common rail. In this type of design, a single pump may pump the fluid for the common rail. One hydraulic circuit may demand more flow or more pressure than another circuit. Because a single pump delivers fluid to all circuits, there is a danger in that fluid or pressure may be delivered to a circuit at a rate or pressure that could damage the hydraulic function of the circuit. For example, excess flow or pressure to a hydraulic cylinder or to a hydraulic motor beyond the maximum capacities of these devices can cause the devices to fail.

What is needed is a system and method for controlling an IMV assembly that allows for adjacent sections of the hydraulic circuit to perform optimally without having to modify the electronic control of the metering stem. More specifically, there is a need for a way to hydro-mechanically limit the flow to a first IMV assembly when an adjacent second section of the hydraulic system demands high flow so that the high flow demanded by the second hydraulic system does not damage the hydraulic function of the first IMV assembly. Limiting flow to an IMV hydro-mechanically would be faster than relying upon the electronic control system and could possibly avoid damage to a motor or cylinder.

SUMMARY OF THE DISCLOSURE

An independent metering valve (IMV) assembly is disclosed that includes a metering stem including an inlet. The IMV assembly also includes a hydro-mechanical control valve in communication with a fluid source and the inlet. The control valve includes a biasing member that biases the control valve towards an open position thereby establishing communication between the fluid source and the inlet during a high pressure condition. The biasing member allows the control valve to move towards a closed position thereby reducing flow to the inlet during a low pressure condition.

Another independent metering valve (IMV) assembly is disclosed that includes a metering stem including an inlet and first and second metering valves each in communication with the inlet in parallel. The first metering valve may be in communication with a first outlet. The second metering valve may be in communication with a second outlet. The metering stem further includes a third metering valve disposed between the first outlet and a return port and a fourth metering valve disposed between the second outlet and the return port. The IMV assembly further includes a pre-loaded directional control valve in communication with a variable displacement pump that may be in communication with a fluid source. The control valve may also be in communication with the inlet. The control valve includes a biasing member in communication with the metering stem that biases the control valve towards an open position establishing communication between the fluid source and the inlet during a high pressure condition. The biasing member moves the control valve towards a closed position thereby limiting flow through the control valve or isolating the fluid source from the inlet when the pressure or flow being delivered is too high or beyond the capacity of the hydraulic function associated with the IMV assembly.

A method is disclosed for hydro-mechanically limiting flow through an independent metering valve (IMV) assembly when a high flow or high pressure is being supplied by the common pump. The disclosed method includes providing an IMV assembly that includes a metering stem including an inlet. The assembly further includes a hydro-mechanical control valve in communication with a fluid source and the inlet. The control valve includes a biasing member that biases the control valve towards an open position thereby establishing communication between the fluid source and the inlet during a high pressure condition. The biasing member moves the control valve towards a closed position during a high pressure condition thereby preventing too much flow or too high of a load to reach the hydraulic function associated with the IMV assembly. The method may further include the biasing member to collapse and move the control valve towards a closed position thereby reducing flow to the inlet or isolating the fluid source from the inlet.

In any one or more the embodiments described above, the biasing member may be in communication with the metering stem. In any one or more the embodiments described above, the biasing member imposes a predetermined force on the control valve to maintain the control valve in an open position. In any one or more the embodiments described above, the biasing member and open end of the stem are in communication with a signal line that may be in communication with the metering stem.

In any one or more of the embodiments described above, the IMV assembly also includes a check valve and an orifice disposed between the control valve and the inlet. The control valve includes a stem with a closed end and an open end. The biasing member engages the open end of the stem. The assembly further includes a load signal line in communication with the closed end of the stem and a point between the check valve and the control valve. The biasing member and open end of the stem may be in communication with a signal line that is in communication with the inlet. When the pressure being delivered by the pump is too high, high pressure will exist in the load signal line that will overcome the bias of the biasing member and the pressure in the signal line to move the valve towards a closed position.

In any one or more of the embodiments described above, the metering stem further includes first and second metering valves each in communication with the inlet in parallel. The first metering valve is in communication with a first outlet. The second metering valve is in communication with a second outlet. The metering stem further including a third metering valve disposed between the first outlet and a return port and a fourth metering valve disposed between the second outlet and the return port. The assembly may further include a cylinder with a head chamber, a rod chamber and a piston disposed therebetween. The first outlet may be in communication with the head chamber and the second outlet may be in communication with the rod chamber. As an alternative, instead of a hydraulic cylinder, the assembly may further include a hydraulic motor. The first outlet may be in communication with one side of the motor and the second outlet may be in communication with the other side of the motor.

In any one or more of the embodiments described above, the first outlet may be in communication with a first pressure relief valve. In any one or more of the embodiments described above, the head chamber or hydraulic motor may be in communication with a first pressure relief valve. In any one or more of the embodiments described above, the second outlet may be in communication with a second pressure relief valve. In any one or more the embodiments described above, the rod chamber or hydraulic motor may be in communication with a second pressure relief valve. In any one or more the embodiments described above, the metering valves are normally closed directional control valves having two ports and two finite positions. In any one or more the embodiments described above, the metering valves individually and electronically controlled by a controller and the control valve may be hydro-mechanically controlled by pressure in the load signal line, pressure in the signal line and the biasing member.

DETAILED DESCRIPTION

Figure 1:
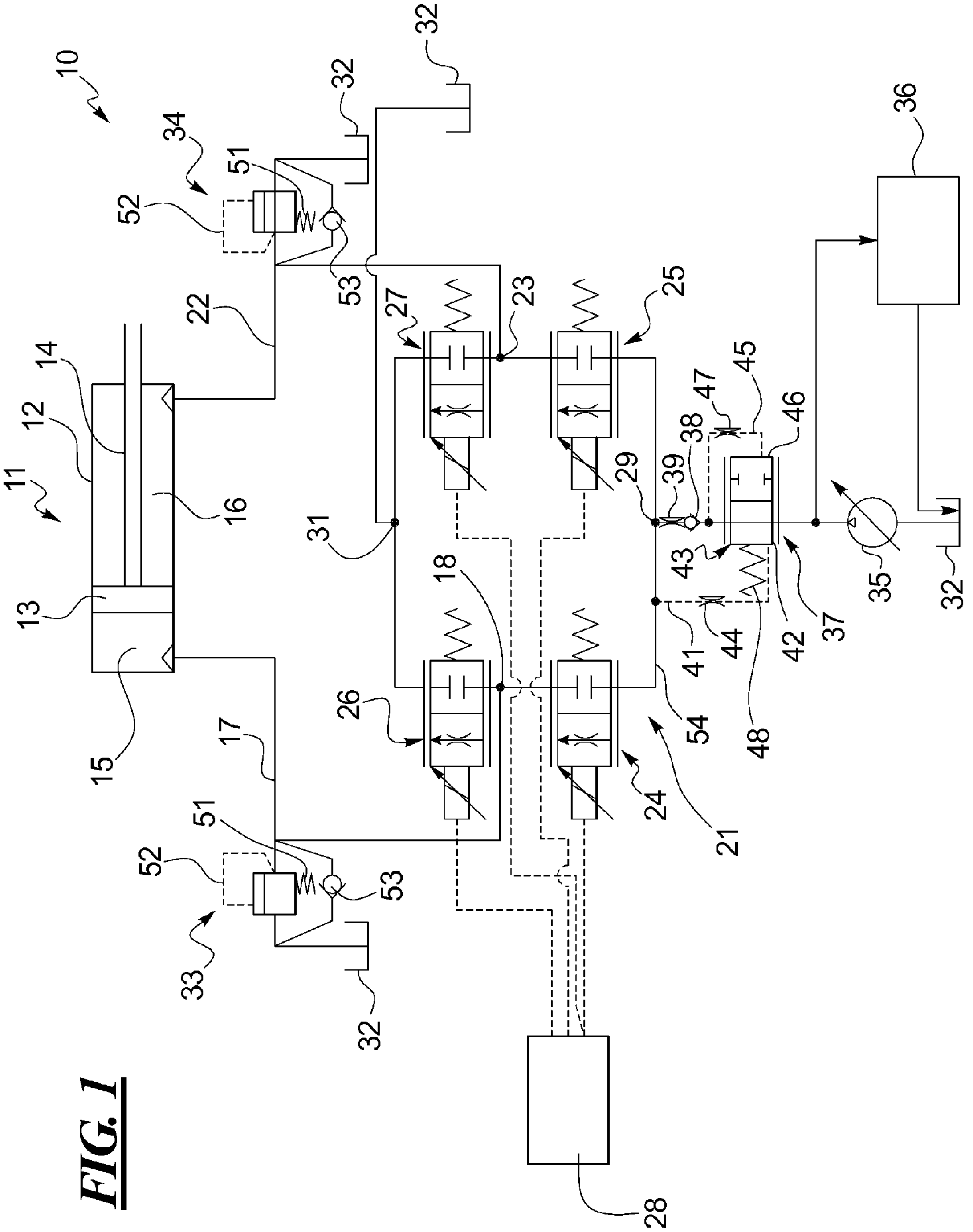
FIG. 1 is a schematic illustration of a hydraulic circuit in accordance with this disclosure.

Referring to FIG. 1, a hydraulic circuit 10 is shown. The hydraulic circuit 10 powers a hydraulic cylinder 11 which includes a housing 12 that accommodates a piston 13 and a rod 14. Between the piston 13 and the housing 12 is an expandable/retractable head chamber 15. Opposite the piston 13 from the head chamber 15 is a rod chamber 16. The head chamber 15 may be in communication with the outlet line 17 that may be connected to the outlet 18 of the metering stem 21, which will be discussed in greater detail below. The rod chamber 16 may be in communication with the outlet line 22 which may be connected to the outlet 23 of the metering stem 21.

The metering stem 21 includes four metering valves 24-27 which are normally closed directional control valves that may be individually controlled by the controller 28. In addition to the two outlets 18, 23, the metering stem 21 includes a return port 31 and an inlet 29. The return port 31 provides communication between the metering stem 21 and the tank, reservoir or rail shown at 32. A common tank, reservoir or rail 32 is shown for each pressure relief valve 33, 34, the return port 31 and as a source of fluid for the variable displacement pump 35. The reservoir 32, which may be a common rail, may also provide fluid for an adjacent hydraulic section 36. The pump 35 may be the only pump associated with the common rail as well which is why delivering a high load or high flow to one hydraulic section can damage the function of an adjacent hydraulic section.

A hydro-mechanically controlled control valve 37 may be disposed between the pump 35 and the inlet 29. The control valve 37 is shown in the open position providing communication between the pump 35, the check valve 38, the fixed orifice 39 and the inlet 29. A signal line 41 provides communication between the metering stem 21 and the open end 42 of the spool 43 of the control valve 37. The signal line 41 includes a fixed orifice 44. Another load signal line 45 provides communication between the closed end 46 of the spool 43 and the inlet line between the control valve 37 and the check valve 38. The load signal line 45 also includes a fixed orifice 47. The biasing member 48 pre-loads the control valve 37 towards the open position shown in FIG. 1.

In event pressure in the load signal line 45 becomes excessive due to demands imposed on the pump 35, the pressure in the load signal line 45 may overcome the force of the biasing member 48 and the pressure in the signal line 41 and the control valve 37 will move towards a closed position, thereby reducing flow to the inlet 29 and protecting the hydraulic cylinder 11.

In operation, the pump 35 draws fluid from the reservoir 32 and delivers it to the preloaded control valve 37 and an adjacent circuit(s) 36. Under normal operating conditions, the combination of a significant pressure through the signal line 41 in combination with the force imposed by the biasing member 48 moves the control valve 37 to an open position as shown and fluid flows through the control valve 37, past the check valve 38, past the orifice 39 and through the inlet 29 into the metering stem 21.

The controller 28 controls the metering valves 24-27. To load the head chamber 15 with fluid, the controller 28 will open the metering valve 24 and leave the metering valve 25 closed thereby permitting fluid to flow through the metering valve 24, through the outlet 18, through the outlet line 17 and into the head chamber 15. To load fluid into the rod chamber 16, the controller 28 will leave the metering valve 24 closed and open the metering valve 25 thereby permitting fluid to flow through the metering valve 25 to the outlet 23, through the outlet line 22 and into the rod chamber 16.

To release fluid from the head chamber 15, the controller 28 leaves the metering valve 24 closed and opens the metering valve 26 so that fluid can flow from the head chamber 15, through the outlet line 17, through the outlet 18, through the metering valve 26, through the return port 31 and on to the reservoir 32. To release fluid from the rod chamber 16, the controller 28 leaves the metering valve 25 closed and opens the metering valve 27 thereby permitting fluid flow through the outlet line 22, through the outlet 23, through open metering valve 27, through the return port 31 and back to the reservoir 32.

Pressure relief valves 33, 34 are associated with the head and rod chambers 15, 16 respectively. Each pressure relief valve 33, 34 are normally in a closed position due to the bias of the Springs 51. However, when pressure in the outlet lines 17, 22 exceed a predetermined amount, the pressure in the signal lines 52 will reflect this increase in pressure thereby opening the pressure relief valves 33, 34 and allowing fluid to pass through the pressure relief valves 33, 34 and on to the reservoir 32. Fluid proceeding from the outlets 18, 23 to the head chamber 15 or rod chamber 16 respectively may be prevented from flowing to the reservoir 32 by the check valves shown at 53.

In the event the adjacent hydraulic section 36 requires a high flow or high-pressure, pressure in the line 54 of the metering stem 21 would increase due to the use of a common pump 35 but for the disclosed control valve 37. Specifically, pressure in the load signal line 45 will also increase and the force provided by the combined pressure in the load signal line 45 will overcome the force of the biasing member 48 and pressure in the signal line 41. The placement of a check valve 38 and orifice 39 in the line extending between the control valve 37 and the inlet 29 creates pressure in the load signal line 45 in addition to the action of the pump 35. Thus, the pressure in the load signal line 45 will exceed the pressure in the signal line 41 and in certain situations, will exceed the combined force of the pressure in the signal line 41 and the biasing member 48 thereby allowing pressure in the load signal line 45 to move the control valve 37 towards a closed position thereby reducing flow through the control valve 37 to the metering stem 21. As a result, the control valve 37 hydro-mechanically controls flow to the inlet 29 and, in the event of an excess pressure condition caused by the pump 35 and demands of an adjacent hydraulic section 36, the control valve 37 can reduce or completely shut off flow to the inlet 29.

Figure 2:
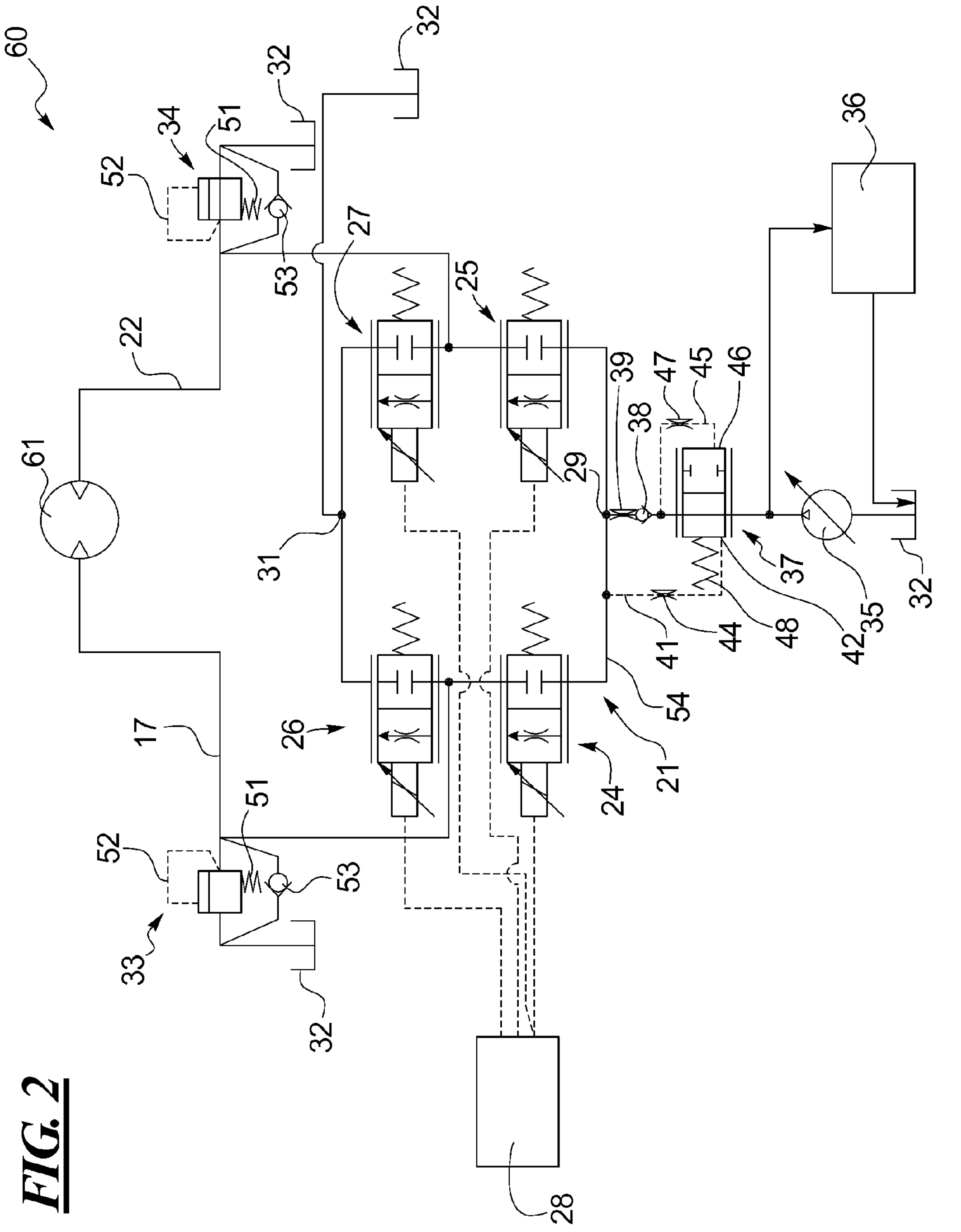
FIG. 2 is a schematic illustration of another hydraulic circuit in accordance with this disclosure.

FIG. 1 illustrates the application of a disclosed hydraulic circuit 10 featuring a disclosed IMV assembly with a hydraulic cylinder 11. FIG. 2, on the other hand, illustrates the same IMV assembly with a hydraulic circuit 60 that drives a hydraulic motor 61. It will be apparent to those skilled in the art that other hydraulic functions other than a cylinder or motor may be operated using the disclosed IMV assemblies and protected from excess load or flow by the control valve 37.

Figure 3:
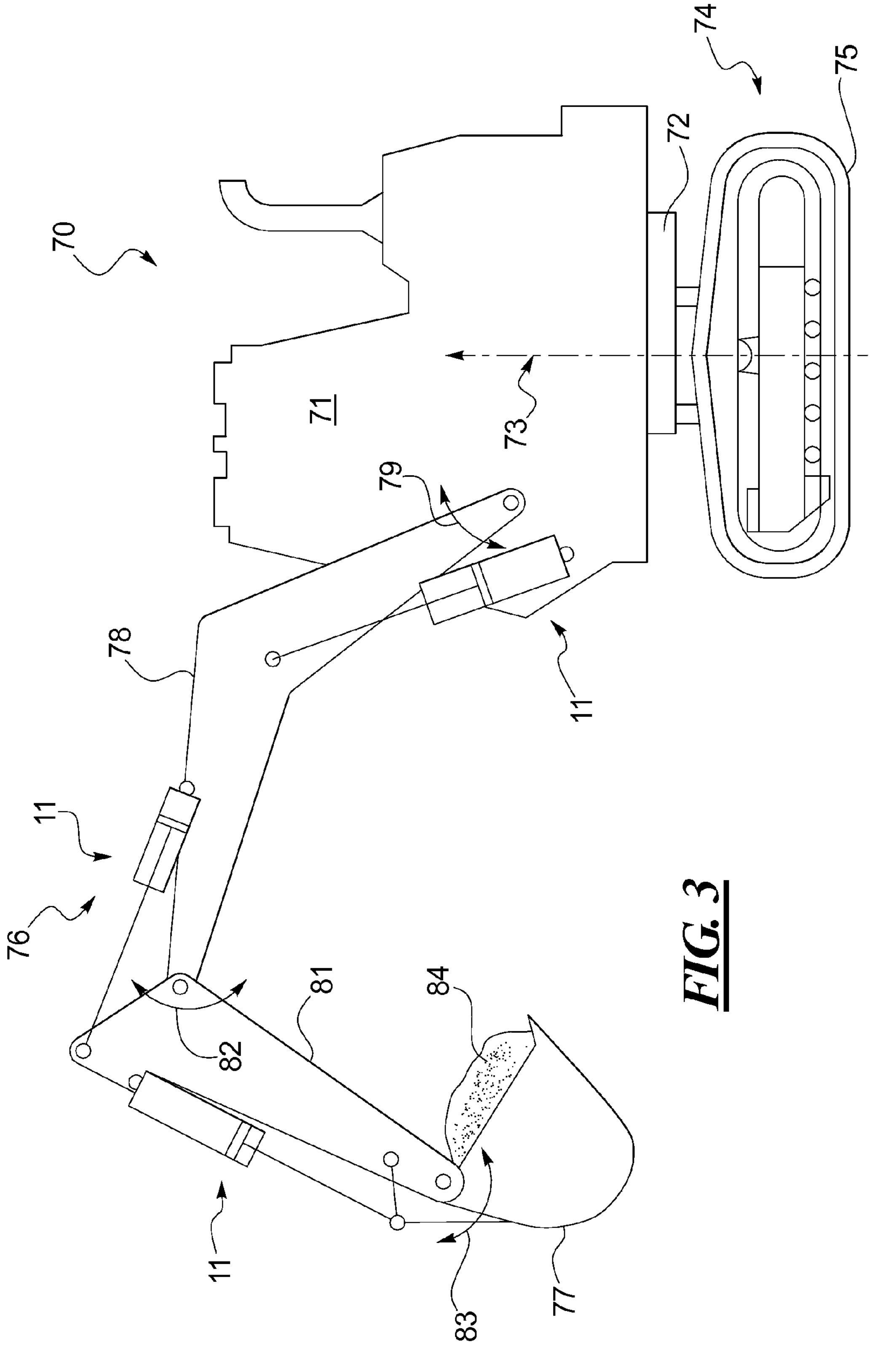
FIG. 3 is a pictorial representation of an exemplary piece of equipment in which the assemblies and methods disclosed herein can be employed.

The described hydraulic circuits 10, 60 may be incorporated in a piece of equipment including, but not limited to, the excavator 70 shown in FIG. 3. The excavator 70 includes a housing 71 that may include a seating area for an operator. The housing 71 may be mounted on a swing assembly 72 that may be configured to rotate or pivot housing 71 about a vertical axis 73. The swing assembly 72 may be powered by a hydraulic actuator, such as, for example, the hydraulic motor 61 (FIG. 2). The control valve 37 and metering stem 21 may control the flow of pressurized fluid to hydraulic motor 61 to thereby control the direction and velocity of movement of swing assembly 72.

The housing 71 and swing assembly 72 may be supported by a traction device 74. The traction device 74 may be any type of device that may be adapted to provide for movement of the excavator 70 around a job site and/or between job sites. For example, the traction device 74 may include a pair of tracks 75 (only one of which is illustrated in FIG. 3). Each track 75 may be powered by a hydraulic actuator, such as, for example, the hydraulic motor 61 (FIG. 2).

The excavator 70 may also include a work implement linkage 76 that may be operatively mounted to a ground engaging tool 77. The work implement linkage 76 may include a boom 78. The boom 78 may be pivotally mounted on the housing 71 for movement in the directions indicated by arrow 79. In another exemplary embodiment, the boom 78 may be mounted directly on the swing assembly 72 and the housing 71 may be fixed relative to traction device 74. In this alternative design, the swing assembly 72 would allow boom to pivot about a vertical axis relative to the housing 71.

The boom 78 may pivotally mount a link 81 for movement in the directions indicated by arrow 82. The link 81 may operatively mount the ground engaging tool 77 for movement in the directions indicated by the arrow 83. The ground engaging tool 77 may be any type of mechanism commonly used on equipment used to move a load 84 of earth, debris, or other material. For example, the ground engaging tool 77 may be a shovel, a bucket, a blade, or a clamshell.

The work implement linkage 76 may be powered by a series of hydraulic actuators, such as, for example, hydraulic cylinders 11 of hydraulic circuit 10 (FIG. 1). The control valve 37 and metering stem 21 of FIG. 1 may limit or control the flow of fluid to and from one of the hydraulic cylinders 11 to thereby control the motion of boom 78, link 81 and work implement tool 77.

The controller 28 (FIGS. 1 and 2) may be adapted to provide controlling signals to each metering valve 24-27 of each hydraulic circuit based on input received from an operator. The controlling signals may be adapted to move the metering valves 24-27 within each of the valve arrangements to control the flow of fluid to and from each hydraulic actuator, such as the hydraulic cylinder 11 or the hydraulic motor 61. In this manner, the controller 28 may generate the particular movement or action desired by the operator.

Industrial Applicability

Independent metering valve (IMV) assemblies are frequently used in a variety of hydraulic systems. Often, IMVs are used in series or are part of a complex hydraulic system. As a result, there may be in need to limit the flow to one IMV assembly due to high flow orpressure being supplied to an adjacent hydraulic section a pump that supplies fluid to both circuits from a common rail. Limiting this flow hydro-mechanically avoids the need to manipulate the metering valves electronically and limiting the flow hydro-mechanically provides a faster response. If an adjacent hydraulic section is in need of higher flow or higher pressure that would be in excess of the capacity of a another cylinder or motor, a delayed response in limiting pressure or flow to cylinder or motor could potentially damage cylinder or motor.

For example, in a stack valve, when there are two hydraulic sections adjacent to each other and each hydraulic section shares the same pump rail or the same pump, if one section needs high flow and the other can operate with a low flow, the hydro-mechanical adjustment provided by this disclosure would limit the amount of flow upstream of the metering stem, without the need to manipulate the metering stems with the controller.

Therefore, in addition to the valve arrangements and hydraulic circuits illustrated in FIGS. 1-2, a method is disclosed for hydro-mechanically limiting flow through an independent metering valve (IMV) assembly when a high flow or high pressure is being supplied to an adjacent hydraulic section by a pump common to both sections. The disclosed method includes providing an IMV assembly that includes a metering stem including an inlet. The assembly further includes a hydro-mechanical control valve in communication with a fluid source and the inlet. The control valve includes a biasing member that biases the control valve towards an open position thereby establishing communication between the fluid source and the inlet during a normal operating condition. Pressure in a load signal line caused by the pump will overcome the force of the biasing member and any pressure in the signal line associated with the open end of the stem to move the control valve towards a closed position.

What is claimed is:

1. An independent metering valve (IMV) assembly comprising:

a metering stem including an inlet, a hydro-mechanical control valve in communication with a fluid source and the metering stem inlet, the control valve including a biasing member that biases the control valve towards an open position thereby establishing communication between the fluid source and the metering stem inlet, the control valve also including a spool with a closed end and an open end, a load signal line fluidly communicating between an outlet of the control valve positioned upstream of the metering stem inlet and the closed end of the spool, a signal line fluidly communicating between the metering stem inlet and the open end of the spool, and an orifice disposed between the load signal line and the metering stem inlet;

wherein pressure in the load signal line moves the control valve towards a closed position thereby overcoming bias of the biasing member and pressure in the signal line to reduce fluid flow to the metering stem inlet during a high pressure condition.

2. The IMV assembly of claim 1 wherein the biasing member imposes a predetermined force on the open end of control valve to maintain the control valve in the open position.

3. The IMV assembly of claim 1 further including a check valve disposed between the load signal line and the metering stem inlet.

4. The IMV assembly of claim 1 wherein the metering stem further includes first and second metering valves each in communication with the metering stem inlet in parallel, the first metering valve in communication with a first metering stem outlet, the second metering valve in communication with a second metering stem outlet, the metering stem further including a third metering valve disposed between the first metering stem outlet and a return port and a fourth metering valve disposed between the second metering stem outlet and the return port, the assembly further including a cylinder with a head chamber, a rod chamber and a piston disposed therebetween, and wherein the first metering stem outlet is in communication with the head chamber and the second metering stem outlet is in communication with the rod chamber.

5. The IMV assembly of claim 4 wherein the head chamber is in communication with a first pressure relief valve.

6. The IMV assembly of claim 4 wherein the rod chamber is in communication with a second pressure relief valve.

7. The IMV assembly of claim 1 wherein the metering stem further includes first and second metering valves each in communication with the metering valve inlet in parallel, the first metering valve in communication with a first metering stem outlet, the second metering valve in communication with a second metering stem outlet, the metering stem further including a third metering valve disposed between the first metering stem outlet and a return port and a fourth metering valve disposed between the second metering stem outlet and the return port, the assembly further including a hydraulic motor with two ports, wherein the first metering stem outlet is in communication with one port and the second metering stem outlet is in communication with the other port.

8. The IMV assembly of claim 1 wherein the metering valves are normally closed directional control valves having two ports and two finite positions.

9. The IMV assembly of claim 4 wherein the metering valves are individually and electronically controlled by a controller and the control valve is hydro-mechanically controlled at least in part by pressure in the load signal line, pressure in the signal line and the biasing member.

10. The IMV assembly of claim 7 wherein the metering valves are individually and electronically controlled by a controller and the control valve is hydro-mechanically controlled at least in part by pressure in the load signal line, pressure in the signal line and the biasing member.

11. An independent metering valve (IMV) assembly comprising:

a metering stem including a metering stem inlet and first and second metering valves each in communication with the metering stem inlet in parallel, the first metering valve in communication with a first metering stem outlet, the second metering valve in communication with a second metering stem outlet;

the metering stem further including a third metering valve disposed between the first metering stem outlet and a return port and a fourth metering valve disposed between the second metering stem outlet and the return port;

a pre-loaded directional control valve in communication with a variable displacement pump that is in communication with a fluid source, the control valve also in communication with the metering stem inlet, the control valve including a biasing member that biases the control valve towards an open position establishing communication between the fluid source and the metering stem inlet, the control valve also including a spool with a closed end and an open end, a load signal line fluidly communicating between an outlet of the control valve positioned upstream of the metering stem inlet and the closed end of the spool, a signal line fluidly communicating between the metering stem inlet and the open end of the spool, and an orifice disposed between the load signal line and the metering stem inlet;

wherein pressure in the load signal line moves the control valve towards a closed position thereby overcoming bias of the biasing member and pressure in the signal line to reduce fluid flow to the metering stem inlet during a high pressure condition.

12. The IMV assembly of claim 11 wherein the biasing member imposes a predetermined force on the control valve to maintain the control valve in an open position.

13. The IMV assembly of claim 11 further including a check valve disposed between the load signal line and the metering stem inlet.

14. The IMV assembly of claim 11 further including a cylinder with a head chamber, a rod chamber and a piston disposed therebetween, and wherein the first metering stem outlet is in communication with the head chamber and the second metering stem outlet is in communication with the rod chamber.

15. The IMV assembly of claim 11 further including a hydraulic motor with two ports, and wherein the first metering stem outlet is in communication with one port and the second metering stem outlet is in communication with the other port.

16. The IMV assembly of claim 11 wherein the metering valves are individually and electronically controlled by a controller and the control valve is hydraulically controlled by pressure in the load signal line, pressure in the signal line and the biasing member.

17. A method for hydro-mechanically limiting flow through an independent metering valve (IMV) assembly when a high flow or high pressure is supplied to an adjacent hydraulic section, the method comprising:

providing an IMV assembly that includes a metering stem including a metering stem inlet, the assembly further including a hydro-mechanical control valve in communication with a fluid source and the metering stem inlet, the control valve including a spool with a closed end and an open end, a biasing member that biases the control valve towards an open position establishing fluid communication between the fluid source and the metering stem inlet, a load signal line fluidly communicating between an outlet of the control valve positioned upstream of the metering stem inlet and the closed end of the spool, a signal line fluidly communicating between the metering stem inlet and the open end of the spool, and an orifice disposed between the load signal line and the metering stem inlet;

allowing high pressure in the load signal line to move the control valve towards a closed position thereby overcoming bias of the biasing member and pressure in the signal line to reduce flow to the metering stem inlet during a high pressure condition.

* * * * *